Patented Feb. 15, 1944

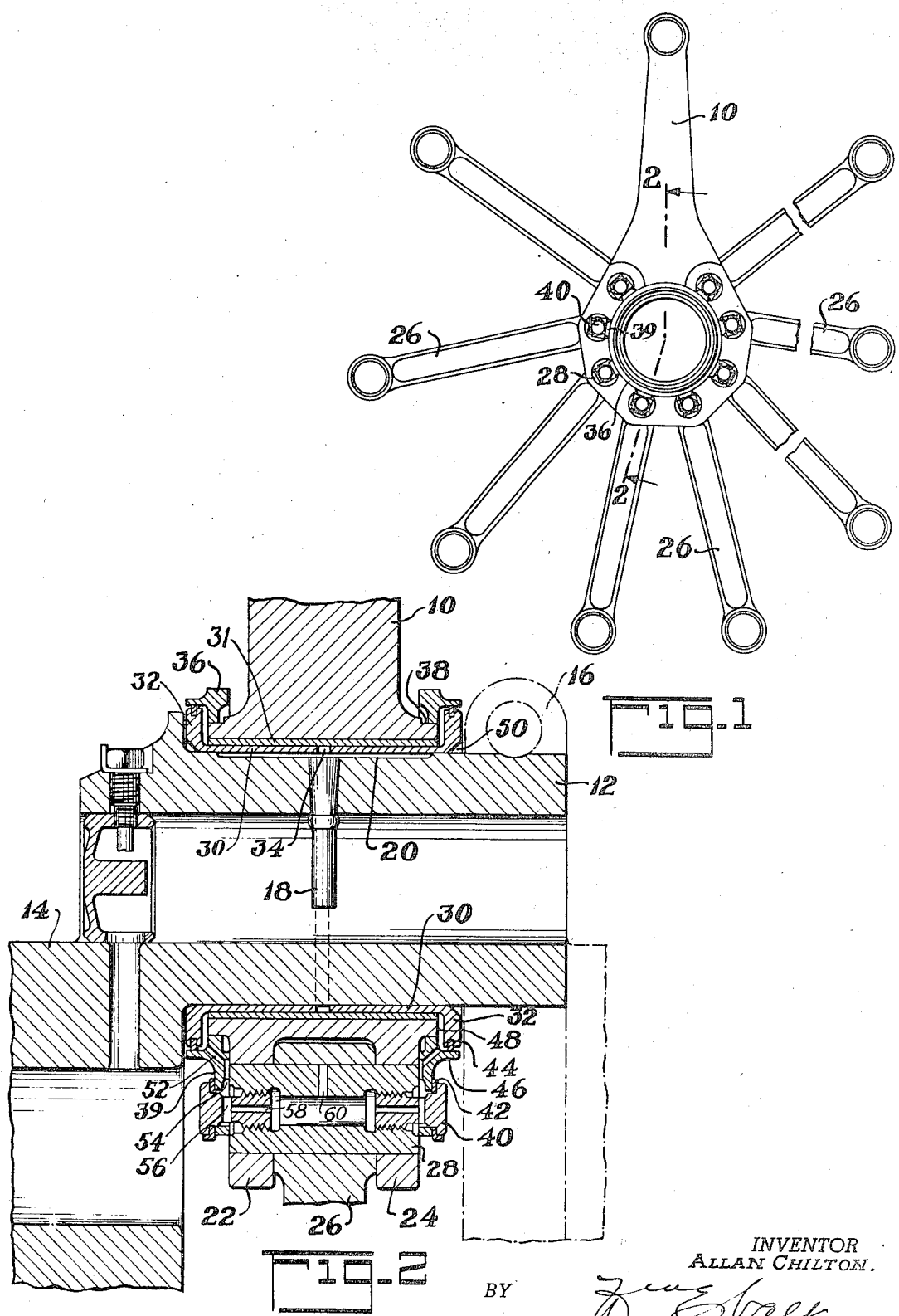

2,342,036

UNITED STATES PATENT OFFICE 2,342,036

CONNECTING ROD LUBRICATION

Allan Chilton, Ridgewood, N. J., assignor to Wright Aeronautical Corporation, a corporation of New York Application October 27, 1942, Serial No. 463,567

12 Claims. (Cl. 308—121)

This invention relates to improved means for lubricating master connecting rod and auxiliary connecting rod bearings of a radial cylinder internal combustion engine. In the conventional master connecting rod bearing, oil is supplied to the center of the bearing and flows to one end of the bearing and from there a portion of the oil is diverted by the knuckle pin locking plates to lubricate the knuckle pins. Consequently, in this prior art construction there is a non-uniform distribution of lubricant in the master rod bearing. Accordingly, it is an object of this invention to provide a master rod bearing in which oil is supplied to the center of the bearing and flows equally to both ends of the bearing for uniform lubrication of this bearing. Furthermore, a portion of this oil is diverted from each end of the master rod bearing to the knuckle pins for lubrication of the auxiliary connecting rod bearings. Specifically, this invention comprises a master connecting rod constructed to permit the use of dual knuckle pin locking plates secured to the knuckle pins and a pair of identical axially displaced master rod bearing sleeves providing a lubricating oil flow path from the center of the master rod bearing to each end of the bearing, said sleeves cooperating with said knuckle pin locking plates to divert a portion of the oil from each end of the master rod bearing to each knuckle pin.

Other objects of the invention will become apparent in reading the annexed detailed description in connection with the drawing, in which:

Fig. 1 is a front elevation of the connecting rod assembly for a radial cylinder internal combustion engine; and Fig. 2 is a section along the line 2—2 of Fig. 1.

Referring to the drawing, the big end of the master connecting rod 10 is mounted about a crankpin 12 having a crankcheek 14 formed integrally therewith, and a rear crankcheek 16 is clamped to the crankpin in the conventional manner. A tube 18 extends into the hollow crankpin through which tube lubricating oil is fed to the conventional partial circumferential recess 20 on the outer surface of the crankpin. The big end of the master rod is provided with flanges 22 and 24 between which auxiliary connecting rods 26 are articulated about knuckle pins 28. The master rod crankpin bearing comprises two identical bearing sleeves 30 of suitable bearing material, the bearing sleeves having flanged ends 32. These sleeves are inserted into the bore of the big end of the master rod into which a hardened steel sleeve 31 has previously been pressed, and these bearing sleeves are of such axial length as to leave an annular space 34 therebetween.

A pair of knuckle pin locking plates 36 are mounted in close contact with the hub ends of the master rod as at 38. These locking plates are provided with radial extensions 39 which are secured to knuckle pins 28 by screws 40 and washers 42 in the conventional manner. The flanges 32 are grooved for the reception of sealing rings 44 which cooperate with axially extending flanges 46 on each locking plate. Annular spaces 48 are provided between the flange 32 of each bearing sleeve and the locking plate and hub end of the master connecting rod. Also, each bearing sleeve is beveled at its outer end to permit a close fit between the bearing sleeve flanges 32 and the adjacent crankcheek thereby forming annular spaces 50.

As a result of the above construction, oil is fed from the crankpin through the tube 18 and the recess 20 to the outer surface of the crankpin thereby filling the annular space 34 between the bearing sleeves 30. These sleeves float and the oil flows over both surfaces of these sleeves to each end of the bearing to the annular spaces 48 and 50. Oil leaks from the annular spaces 50 to the crankcase through a clearance between each bearing sleeve flange and the adjacent crankcheek. Oil is fed from each annular space 48 through passages 52 in the locking plates to shallow cavities 54 under each locking plate extension 39. Each of the screws 40 is provided with passages 56 and 58 through which oil is fed from the cavities 54 into the hollow center of each knuckle pin, and thence through passages 60 to the bearing surface of each knuckle pin and associated auxiliary connecting rod.

Each sleeve 30 is axially movable in response to the differential oil pressure acting on the opposed faces of its associated flange 32 by the oil flowing over said opposed faces. Accordingly each sleeve assumes an axial position such that substantially equal flow of oil takes place across each of its surfaces in order to equalize the oil pressure on opposite sides of its flange 32.

As a modification of the above construction, the relatively soft bearing sleeves 30 may be replaced with hardened steel sleeves, while the inside of the bore in the big end of the master rod and the outer surface of the crankpin is plated with a suitable bearing material. This construction eliminates the costly and difficult hardening process on the crankpin. However, with either construction, the master rod bearing comprises two bearing sleeves which are axially displaced to leave an annular space therebetween to which lubricating oil is fed from the crankpin. From this annular space the oil flows over both surfaces of both sleeves to each end of the bearing, thereby insuring uniform lubrication of the master rod bearing. Also, the oil flowing from the outer surfaces of these sleeves is fed to the knuckle pin bearings through passages in the knuckle pin locking plates to thereby provide adequate lubrication of the knuckle pins.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a master connecting rod having a bore in its big end journaled about a crankpin, a pair of annular bearing sleeves fitted to said bore and about said crankpin, said sleeves being axially displaced to leave an annular space about said crankpin between the adjacent ends of the sleeves each of said sleeves having an annular flange extending radially outward between the big end of the master rod and the adjacent crankcheek and in spaced relation thereto, and means to feed lubricating oil to said annular space whereby oil flows from said space in both axial directions toward each end of the bore and over both surfaces of each sleeve and its associated flange.

2. In combination, a connecting rod having a bore in its big end journaled about a crankpin, a pair of freely floating annular bearing sleeves fitted to said bore and about said crankpin, said sleeves being axially displaced to leave an annular space about said crankpin between the adjacent ends of the sleeves, and means to feed lubricating oil from within the crankpin to the outer surface of the crankpin at said annular space, whereby lubricating oil flows from said annular space in both axial directions and over both surfaces of each sleeve.

3. In combination, a member journaled about a shaft, a pair of annular bearing sleeves between said member and shaft, extending toward each other from opposite axial ends of said member and terminating short of each other to leave an annular space therebetween about said shaft each of said sleeves having a radially extending annular flange, and means to feed lubricating oil to said annular space, whereby lubricating oil flows from said space in both axial directions toward each axial end of said member and over both surfaces of each bearing sleeve each of said sleeves being axially movable to control the lubricating oil pressure acting on opposite sides of its flange.

4. In combination, a connecting rod journaled about a crankpin, a pair of annular bearing sleeves between said rod and crankpin extending toward each other from opposite axial sides of said rod and terminating short of each other to leave an annular space therebetween and about said crankpin, and means to feed lubricating oil from within the crankpin to the outer surface of the crankpin at said annular space, whereby lubricating oil flows from said annular space in both axial directions and over both surfaces of each bearing sleeve, each of said sleeves being axially movable to control the oil flow over its surfaces.

5. In combination, a master connecting rod having a bore in its big end journaled about a crankpin, a pair of annular bearing sleeves fitted to said bore and about said crankpin, said sleeves being axially displaced to leave an annular space about said crankpin between the adjacent ends of the sleeves each of said sleeves having an annular flange extending radially outward between the big end of the master rod and the adjacent crankcheek and in spaced relation thereto, means to feed lubricating oil from within the crankpin to the outer surface of the crankpin at said annular space, whereby oil flows from said annular space in both axial directions toward each end of the bore and over both surfaces of each sleeve, a plurality of auxiliary connecting rods journaled about knuckle pins carried by the big end of said master rod, and means providing an oil flow path from each end of the bore to each knuckle pin.

6. In combination, a master connecting rod having a bore in its big end journaled about a crankpin, a pair of annular bearing sleeves fitted to said bore and about said crankpin, said sleeves being axially displaced to leave an annular space about said crankpin between the adjacent ends of the sleeves, means to feed lubricating oil from within the crankpin to the outer surface of the crankpin at said annular space, whereby lubricating oil flows from said annular space in both axial directions and over both surfaces of each sleeve, a plurality of auxiliary connecting rods journaled about knuckle pins carried by the big end of said master rod, and means to feed the lubricating oil flowing in both axial directions over the outer surface of each sleeve to each of said knuckle pins.

7. In combination, a master connecting rod having a bore in its big end journaled about a crankpin, a pair of annular bearing sleeves fitted to said bore and crankpin, said sleeves being axially displaced to leave an annular space about said crankpin between the adjacent ends of the sleeves, means to feed lubricating oil from within the crankpin to the outer surface of the crankpin at said annular space whereby oil flows from said annular space in both axial directions toward each end of the bore and over both surfaces of each sleeve, each of said sleeves being axially movable to control the oil flow over its surfaces, a plurality of auxiliary connecting rods journaled about knuckle pins carried by the big end of said master rod, annular knuckle pin locking plates overlying each end of the knuckle pins and providing an oil flow path from each end of said bore to each knuckle pin.

8. In combination, a master connecting rod having a bore in its big end journaled about a crankpin between cranckcheeks, a pair of bearing sleeves fitted to said bore and crankpin, said sleeves extending toward each other from respective ends of said bore and each having a flange at its outer end interposed between the adjacent crankcheek and big end of the master rod, the inner ends of said sleeve terminating short of each other to leave an annular space therebetween and about said crankpin, means to feed lubricating oil from within the crankpin to the outer surface thereof at said annular space whereby lubricating oil flows from said annular space in both axial directions and over both surfaces of each sleeve, a plurality of auxiliary connecting rods journaled about knuckle pins carried by the big end of the master rod, annular knuckle pin locking plates on each side of said big end in oil-sealing engagement with said bearing sleeve flanges, and means to secure said locking plates to each of said knuckle pins, each of said locking plates and securing means being provided with passageways to provide an oil flow path to each knuckle pin from the space between each bearing sleeve flange and the adjacent side of the big end of said master rod.

9. In combination, a master connecting rod having its big end journaled about a crankpin, a pair of bearing sleeves between said rod and crankpin, extending toward each other from opposite axial sides of said master rod and terminating short of each other to leave an annular space therebetween about said crankpin, each sleeve having a flange extending radially outward between the big end of the master connecting rod and the adjacent crankcheek, means to feed lubricating oil from within the crankpin to the outer surface of the crankpin at said annular space whereby lubricating oil flows from said annular space in both axial directions and over both surfaces of each sleeve, a plurality of auxiliary connecting rods journaled about knuckle pins carried by the big end of said master rod, knuckle pin locking plates on each side of the big end of said master rod in oil-sealing engagement with said bearing sleeve flanges, and means to secure said locking plates to each of said knuckle pins, each of said locking plates and securing means being provided with passageways to provide an oil flow path from the outer surface of said bearing sleeves to each knuckle pin.

10. In combination, a master connecting rod having a bore in its big end journaled about a crankpin, a pair of identical bearing sleeves fitted to said bore and about said crankpin, said sleeves being axially displaced to leave an annular space between the adjacent inner ends of the sleeve and about said crankpin, the outer ends of said sleeves projecting outwardly beyond the ends of said bore, means to feed lubricating oil from within the crankpin to the outer surface of the crankpin at said annular space whereby lubricating oil flows from said annular space in both axial directions and over both surfaces of each sleeve, a plurality of auxiliary connecting rods journaled about knuckle pins carried by the big end of said master rod, annular knuckle pin locking plates overlying each end of the knuckle pins and having an oil-sealing engagement with projecting ends of said bearing sleeves to define annular chambers with the adjacent sides of the big end of the master rod, and passageways connecting each of said annular chambers with the knuckle pins to provide an oil flow path from the outer surface of said bearing sleeves to each of said knuckle pins.

11. In combination, a master connecting rod having its big end journaled about a crankpin, a pair of bearing sleeves fitted to said bore and about said crankpin, said sleeves being axially displaced to leave an annular space between the adjacent inner ends of the sleeves and about said crankpin, the outer ends of said sleeves projecting outwardly beyond the ends of said bore, means to feed lubricating oil from within the crankpin to the outer surface of the crankpin at said annular space whereby lubricating oil flows from said annular space in both axial directions and over both surfaces of each sleeve, a plurality of auxiliary connecting rods journaled about knuckle pins carried by the big end of said master rod, annular knuckle pin locking plates on each side of the big end of said master rod and having an oil-sealing engagement with the projecting ends of said bearing sleeves, each of said locking plates having a plurality of radial projections each overlying an end of one of the knuckle pins, said locking plates with their radial projections providing an oil flow path from the outer surface of said bearing sleeves to each of said knuckle pins.

12. In combination, a master connecting rod having its big end journaled about crankpin, a pair of annular bearing sleeves fitted therebetween, said sleeves being axially displaced to leave an annular space about said crankpin between the adjacent ends of said sleeves, means to feed lubricating oil from within the crankpin to the outer surface of said crankpin adjacent to said annular space whereby lubricating oil flows from said annular space in both axial directions therefrom and over both surfaces of each sleeve, a plurality of auxiliary connecting rods journaled about knuckle pins carried by the big end of said master rod, knuckle pin locking plates disposed on each side of the big end of the master rod, each of said locking plates extending into oil sealing engagement with the adjacent bearing sleeve, and means to feed the lubricating oil flowing over the outer surface of the bearing sleeves to each of said knuckle pins.

ALLAN CHILTON.